United States Patent
Koyuhara et al.

(10) Patent No.: US 10,950,375 B2
(45) Date of Patent: Mar. 16, 2021

(54) MNZN FERRITE CORE AND ITS PRODUCTION METHOD

(71) Applicant: HITACHI METALS, LTD., Tokyo (JP)

(72) Inventors: Norikazu Koyuhara, Tokyo (JP); Yasuharu Miyoshi, Tokyo (JP); Tomoyuki Tada, Tokyo (JP); Satoru Tanaka, Tottori (JP)

(73) Assignee: HITACHI METALS. LTD., Tokyo (JP)

( * ) Notice: Subject to any disclaimer, the term of this patent is extended or adjusted under 35 U.S.C. 154(b) by 363 days.

(21) Appl. No.: 16/086,381

(22) PCT Filed: Mar. 24, 2017

(86) PCT No.: PCT/JP2017/011932
§ 371 (c)(1),
(2) Date: Sep. 19, 2018

(87) PCT Pub. No.: WO2017/164351
PCT Pub. Date: Sep. 28, 2017

(65) Prior Publication Data
US 2019/0096554 A1 Mar. 28, 2019

(30) Foreign Application Priority Data
Mar. 25, 2016 (JP) ................. 2016-061483

(51) Int. Cl.
*H01F 1/34* (2006.01)
*H01F 27/255* (2006.01)
*H01F 41/02* (2006.01)
*C01G 49/00* (2006.01)
(Continued)

(52) U.S. Cl.
CPC ............ *H01F 1/344* (2013.01); *C01G 49/00* (2013.01); *C04B 35/265* (2013.01); *C04B 35/2608* (2013.01); *C04B 35/2658* (2013.01); *C04B 35/64* (2013.01); *H01F 1/34* (2013.01); *H01F 27/255* (2013.01); *H01F 41/02* (2013.01); *H01F 41/0246* (2013.01); *C04B 2235/3208* (2013.01); *C04B 2235/3239* (2013.01); *C04B 2235/3251* (2013.01); *C04B 2235/3262* (2013.01); *C04B 2235/3274* (2013.01); *C04B 2235/3275* (2013.01); *C04B 2235/3277* (2013.01); *C04B 2235/3284* (2013.01); *C04B 2235/3418* (2013.01); *C04B 2235/442* (2013.01); *C04B 2235/602* (2013.01); *C04B 2235/6562* (2013.01); *C04B 2235/6565* (2013.01); *C04B 2235/6567* (2013.01); *C04B 2235/6583* (2013.01); *C04B 2235/786* (2013.01); *C04B 2235/96* (2013.01)

(58) Field of Classification Search
CPC .... H01F 1/344; H01F 27/255; H01F 41/0246; C04B 35/2658; C04B 35/265; C04B 35/2608; C04B 35/64; C04B 2235/6362; C04B 2235/6567; C04B 2235/6565; C04B 2235/96; C04B 2235/6583
See application file for complete search history.

(56) References Cited

U.S. PATENT DOCUMENTS

| 7,450,972 | B2 * | 11/2008 | Klausner ................. B60R 16/02 |
| | | | 455/41.2 |
| 7,790,053 | B2 | 9/2010 | Ishiwaki et al. |
| 2008/0007377 | A1 | 1/2008 | Ishiwaki et al. |

(Continued)

FOREIGN PATENT DOCUMENTS

| JP | 2002-367822 A | 12/2002 |
| JP | 2007-070209 A | 3/2007 |

(Continued)

OTHER PUBLICATIONS

International Search Report for PCT/JP2017/011932 dated Jun. 6, 2017.
Communication dated Jul. 15, 2019, from the European Patent Office in counterpart European Application No. 17770391.5.

* cited by examiner

*Primary Examiner* — C Melissa Koslow
(74) *Attorney, Agent, or Firm* — Sughrue Mion, PLLC

(57) ABSTRACT

A method for producing a MnZn ferrite core used at a frequency of 1 MHz or more and an exciting magnetic flux density of 75 mT or less, the MnZn ferrite comprising 53-56% by mol of Fe (calculated as $Fe_2O_3$), and 3-9% by mol of Zn (calculated as ZnO), the balance being Mn (calculated as MnO), as main components, and 0.05-0.4 parts by mass of Co (calculated as $Co_3O_4$) as a sub-component, per 100 parts by mass in total of the main components (calculated as the oxides); comprising a step of molding a raw material powder for the MnZn ferrite to obtain a green body; a step of sintering the green body and cooling it to a temperature of lower than 150° C. to obtain a sintered body of MnZn ferrite; and a step of conducting a heat treatment comprising heating the sintered body of MnZn ferrite to a temperature meeting Condition 1 of 200° C. or higher, and Condition 2 of (Tc−90)° C. to (Tc+100)° C., wherein Tc is a Curie temperature (° C.) calculated from the percentages by mol of $Fe_2O_3$ and ZnO contained in the main components of the MnZn ferrite, keeping the sintered body at the above temperature for a predetermined period of time, and then cooling the sintered body from the keeping temperature at a speed of 50° C./hour or less.

8 Claims, 2 Drawing Sheets

(51) Int. Cl.
*C04B 35/26* (2006.01)
*C04B 35/64* (2006.01)

(56) References Cited

U.S. PATENT DOCUMENTS

2009/0242827 A1 10/2009 Nakahata et al.
2017/0278607 A1 9/2017 Tada et al.
2017/0352455 A1* 12/2017 Koyuhara ................. H01F 1/36

FOREIGN PATENT DOCUMENTS

| JP | 2007-112695 A | | 5/2007 |
| JP | 2007-112696 | * | 5/2007 |
| WO | 2006/054749 A1 | | 5/2006 |
| WO | 2016/032001 A1 | | 3/2016 |
| WO | WO 2016/104593 | * | 6/2016 |

MNZN FERRITE CORE AND ITS PRODUCTION METHOD

CROSS REFERENCE TO RELATED APPLICATIONS

This application is a National Stage of International Application No. PCT/JP2017/011932 filed Mar. 24, 2017, claiming priority based on Japanese Patent Application No. 2016-061483 filed Mar. 25, 2016.

FIELD OF THE INVENTION

The present invention relates to a method for producing a MnZn ferrite core used in electronic devices, functional elements such as transformers, choke coils, etc., in switching power supplies, etc.

BACKGROUND OF THE INVENTION

Switching power supplies are used in power supply circuits in various electronic apparatuses needing power supply, in electric vehicles (EVs), hybrid electric vehicles (HEVs), mobile communications equipments (cell phones, smartphones, etc.), personal computers, servers, etc.

Recent electronic apparatuses are increasingly required to be small and light in weight, consuming less electric power from the aspect of energy efficiency. Accordingly, large-scale integrated circuits (LSIs) such as digital signal processors (DSPs), micro-processing units (MPUs), etc., and functional elements used in electronic apparatuses are also required to be smaller and have higher performance and lower power consumption. On the other hand, recent higher integration of transistors by finer wiring in LSIs reduces the breakdown voltage of transistors and increases current consumption, resulting in increasingly lower operation voltage and larger current.

Power supply circuits such as DC-DC converters for supplying power to LSIs should also be adapted to lower-voltage, higher-current operation of LSIs. For example, lowering the operation voltage of LSIs narrows a normally operable voltage range, resulting in fluctuated power supply voltage of LSIs due to the ripple of voltage from power supply circuits, so that the operation of LSIs becomes unstable. Accordingly, the switching frequencies of power supply circuits have been increased, for example, to 500 kHz or more.

Higher frequencies and current of power supply circuits are advantageous in reducing the sizes of magnetic cores constituting electronic devices such as transformers, choke coils, etc. used in the circuits. For example, when a transformer is operated with a sinusoidal wave, voltage Ep (V) applied to a primary coil is expressed by the formula:

$$Ep = 4.44 \times Np \times A \times f \times Bm \times 10^{-7},$$

wherein Np represents the number of winding of the primary coil, A represents a cross section area (cm$^2$) of a magnetic core, f represents a frequency (Hz), and Bm represents an exciting magnetic flux density (mT).

This formula indicates that when voltage Ep having a higher switching frequency f is applied to a primary coil, a magnetic core can have a smaller cross section area A, resulting in a smaller size. Also, higher current increases the maximum exciting magnetic flux density Bm, which is called "exciting magnetic flux density" below, resulting in a smaller magnetic core.

Suitably miniaturizable magnetic cores operated at a high exciting magnetic flux density in a high frequency range are mainly made of MnZn ferrite as a magnetic material. MnZn ferrite has larger initial permeability and saturation magnetic flux density than those of Ni ferrite, etc., and smaller core loss than those of magnetic cores of Fe-based amorphous alloys, Co-based amorphous alloys, pure iron, and magnetic metals such as Fe—Si, Fe—Ni, Fe—Si—Cr, and Fe—Si—Al. Small core loss is advantageous in suppressing the power consumption of power supply circuits. The core loss of MnZn ferrite has conventionally been reduced by various means from the aspects of crystal grains, composition, production method, etc. It is known that the core loss is effectively lowered in a high frequency range, by reducing the crystal grain sizes of MnZn ferrite, and insulating crystal grains with high-electric-resistance grain boundary phases containing Si and Ca.

Power supply circuits may be subject to higher than 100° C. by the heat generation of constituent devices and peripheral circuits, ambient temperatures, etc., so that they are required to be stably operable at such high temperatures.

JP 2007-112695 A (Patent Reference 1) discloses MnZn-ferrite, whose core loss in a high frequency range of 500 kHz or more is lowered by keeping a sintered body in a temperature range of 200-350° C. for 0.3-12 hours, or by setting a cooling speed to 45° C./hour or less in a cooling process from a range of 240-350° C. after sintering at a predetermined temperature.

The production method disclosed in Patent Reference 1 is an effective method for reducing core loss, but further decrease in core loss is required for MnZn ferrite in a wide temperature range. Accordingly, technologies for further reducing core loss are desired.

OBJECT OF THE INVENTION

Accordingly, an object of the present invention is to provide a method for producing a MnZn ferrite core, whose loss can be lowered, and a MnZn ferrite core.

SUMMARY OF THE INVENTION

The method of the present invention for producing a MnZn ferrite core comprising 53-56% by mol of Fe (calculated as Fe$_2$O$_3$), and 3-9% by mol of Zn (calculated as ZnO), the balance being Mn (calculated as MnO), as main components, and 0.05-0.4 parts by mass of Co (calculated as Co$_3$O$_4$) as a sub-component per 100 parts by mass in total of the main components (calculated as the oxides), which is used at a frequency of 1 MHz or more and an exciting magnetic flux density of 75 mT or less; comprises a step of molding a raw material powder for the MnZn ferrite to obtain a green body;

a step of sintering the green body and cooling it to a temperature of lower than 150° C. to obtain a sintered body of MnZn ferrite; and a step of conducting a heat treatment comprising heating the sintered body of MnZn ferrite to a temperature meeting the following conditions:

Condition 1: 200° C. or higher, and

Condition 2: (Tc−90)° C. to (Tc+100)° C., wherein Tc is a Curie temperature (° C.) calculated from the percentages by mol of Fe$_2$O$_3$ and ZnO contained in the main components of the MnZn ferrite, keeping the sintered body at the above temperature for a predetermined period of time, and then cooling the sintered body from the keeping temperature at a speed of 50° C./hour or less.

In the present invention, the sintering step preferably provides the sintered body of MnZn ferrite with core loss Pcv of less than 4000 kW/m³ between 0° C. and 120° C., at a frequency of 2 MHz and an exciting magnetic flux density of 50 mT.

In the present invention, the heat treatment step preferably provides the sintered body of MnZn ferrite with core loss Pcv of less than 1500 kW/m³ between 0° C. and 120° C., at a frequency of 2 MHz and an exciting magnetic flux density of 50 mT.

In the present invention, the MnZn ferrite preferably comprises 0.05-0.4 parts by mass of Co (calculated as $Co_3O_4$), 0.003-0.015 parts by mass of Si (calculated as $SiO_2$), 0.06-0.3 parts by mass of Ca (calculated as $CaCO_3$), 0-0.1 parts by mass of V (calculated as $V_2O_5$), and 0-0.3 parts by mass in total of Nb (calculated as $Nb_2O_5$) and/or Ta (calculated as $Ta_2O_5$) as sub-components, per 100 parts by mass in total of the main components (calculated as the oxides).

In the present invention, the sintering step preferably comprises a temperature-elevating step, a high-temperature-keeping step, and a cooling step; the high-temperature-keeping step being conducted at a keeping temperature of higher than 1050° C. and lower than 1150° C. in an atmosphere having an oxygen concentration of 0.4-2% by volume; and the cooling step being conducted in an oxygen concentration in a range of 0.001-0.2% by volume from 900° C. to 400° C., and at a cooling speed of 50° C./hour or more from (Tc+70)° C. to 100° C.

During the cooling step in the sintering step, the cooling speed from the keeping temperature to 100° C. is preferably 50° C./hour or more.

The MnZn ferrite core of the present invention used at a frequency of 1 MHz or more and an exciting magnetic flux density of 75 mT or less comprises 53-56% by mol of Fe (calculated as $Fe_2O_3$), and 3-9% by mol of Zn (calculated as ZnO), the balance being Mn (calculated as MnO), as main components, and 0.05-0.4 parts by mass of Co (calculated as $Co_3O_4$), 0.003-0.015 parts by mass of Si (calculated as $SiO_2$), 0.06-0.3 parts by mass of Ca (calculated as $CaCO_3$), 0-0.1 parts by mass of V (calculated as $V_2O_5$), 0.05 parts or less (not including 0) by mass of Nb (calculated as $Nb_2O_5$), and 0-0.1 parts by mass of Ta (calculated as $Ta_2O_5$) as sub-components, per 100 parts by mass in total of the main components (calculated as the oxides); the core loss Pcv between 0° C. and 120° C. being less than 1100 kW/m³ at a frequency of 2 MHz and an exciting magnetic flux density of 50 mT.

The MnZn ferrite core of the present invention preferably contains 0-0.05 parts by mass of V (calculated as $V_2O_5$), 0.01-0.04 parts by mass of Nb (calculated as $Nb_2O_5$), and 0-0.05 parts by mass of Ta (calculated as $Ta_2O_5$).

Effects of the Invention

According to the present invention, a MnZn ferrite core having lower loss and its production method are provided.

DESCRIPTION OF THE PREFERRED EMBODIMENTS

Figure 1:
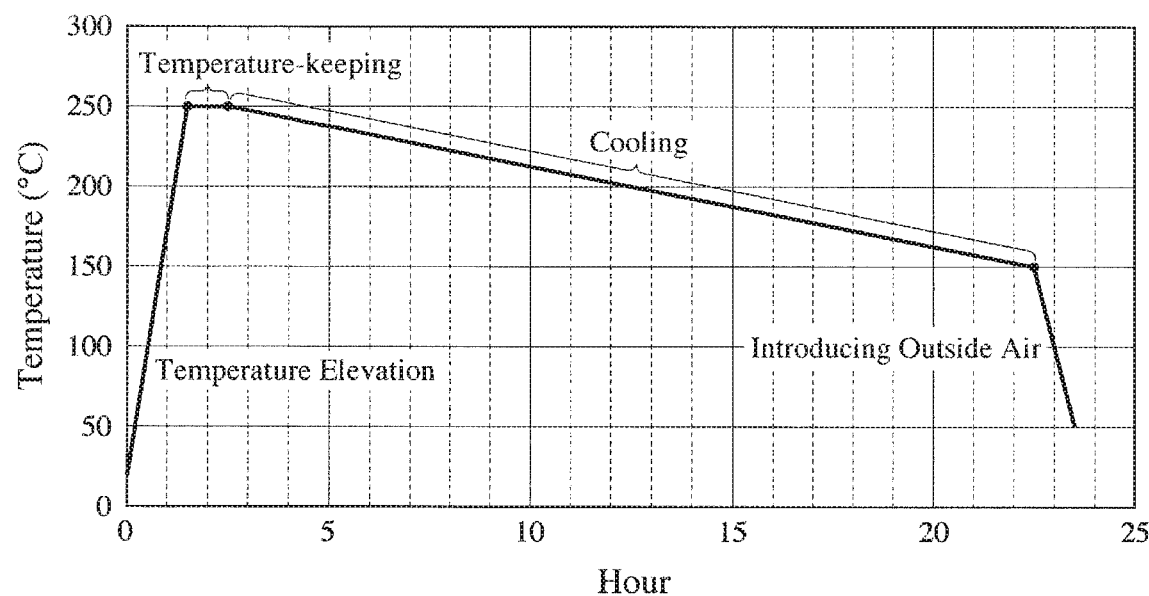
FIG. 1 is a graph showing temperature conditions in a heat treatment step according to an embodiment of the present invention.

The production method of a MnZn ferrite core according to an embodiment of the present invention, and a MnZn ferrite core produced by the above method will be specifically explained below. It should be noted, however, that the present invention is not restricted thereto, but modifications may be made properly within the scope of the technical idea. The numerical range expressed by "-" in this specification means a range including the numbers described before and after "-" as the upper and lower limits.

The method of the present invention for producing a MnZn ferrite core comprises a step of molding a raw material powder for the MnZn ferrite to obtain a green body; a step of sintering the green body and cooling it to a temperature of lower than 150° C. to obtain a sintered body of MnZn ferrite; and a heat treatment step comprising heating the sintered body of MnZn ferrite to a temperature meeting Condition 1: 200° C. or higher, and
Condition 2: (Tc−90)° C. to (Tc+100)° C., keeping the sintered body at the above temperature for a predetermined period of time, and then cooling the sintered body from the keeping temperature at a speed of 50° C./hour or less. With these steps, the core loss of the sintered MnZn ferrite at a frequency of 1 MHz or more and an exciting magnetic flux density of 75 mT or less can be reduced. As described later, the MnZn ferrite of the present invention comprises 53-56% by mol of Fe (calculated as $Fe_2O_3$), and 3-9% by mol of Zn (calculated as ZnO), the balance being Mn (calculated as MnO), as main components, and Tc is a Curie temperature (° C.) calculated from the percentages by mol of $Fe_2O_3$ and ZnO contained in the main components of the MnZn ferrite.

The MnZn ferrite produced by the method of the present invention may not have sufficiently low core loss at a frequency of less than 1 MHz. At 500 kHz or less, the percentage of hysteresis loss is high in the overall core loss, resulting in high core loss, and thus higher core loss in a high temperature range exceeding 100° C. A typical frequency is 1-5 MHz. An exciting magnetic flux density of more than 75 mT may provide large hysteresis loss, failing to sufficiently reduce the core loss. A typical exciting magnetic flux density is 25-75 mT.

In the method of the present invention for producing a MnZn ferrite core, the sintered MnZn ferrite before heat treatment preferably has core loss Pcv of less than 4000 kW/m³ between 0° C. and 120° C., at a frequency of 2 MHz and an exciting magnetic flux density of 50 mT, and a temperature providing the minimum core loss is preferably between 20° C. and 100° C. With such magnetic properties, the sintered body of MnZn ferrite can have lower core loss in a temperature range defined in the above heat treatment.

[1] MnZn Ferrite
(1) Composition
With Fe, Zn and Mn in the desired ranges, the MnZn ferrite can have desired magnetic properties such as initial permeability, saturation magnetic flux density, etc. With Co added as a sub-component to adjust the crystal magnetic anisotropy constant, the temperature characteristics of core loss can be improved.

The MnZn ferrite preferably comprises Fe, Zn and Mn as main components, and at least Co as a sub-component; the main components comprising 53-56% by mol of Fe (calculated as $Fe_2O_3$), and 3-9% by mol of Zn (calculated as ZnO), the balance being Mn (calculated as MnO); and the sub-components comprising 0.05-0.4 parts by mass of Co (calculated as $Co_3O_4$) per 100 parts by mass in total of the main components (calculated as the oxides). The sub-components may further contain 0.003-0.015 parts by mass of Si (calculated as $SiO_2$), 0.06-0.3 parts by mass of Ca (calculated as $CaCO_3$), 0-0.1 parts by mass of V (calculated as $V_2O_5$), and 0-0.3 parts by mass in total of Nb (calculated as $Nb_2O_5$) and/or Ta (calculated as $Ta_2O_5$), per 100 parts by mass in total of the main components (calculated as the oxides).

Fe controls the temperature characteristics of core loss, together with Co. Too small an amount of Fe leads to a too high temperature providing the minimum core loss, while too large an amount of Fe leads to a too low temperature providing the minimum core loss, making it difficult to have a temperature between 20° C. and 100° C. for providing the minimum core loss, resulting in large core loss between 0° C. and 120° C. With the Fe content (calculated as $Fe_2O_3$) between 53% by mol and 56% by mol, low loss can be obtained in a high frequency range of 1 MHz or more. The Fe content is more preferably 54-55% by mol (calculated as $Fe_2O_3$).

Zn controls the frequency characteristics of permeability, having a particularly strong influence on the control of residual core loss due to magnetic wall resonance, etc. A smaller amount of Zn provides lower core loss in a higher frequency range. With the Zn content in 3-9% by mol (calculated as ZnO), low loss can be obtained in a high frequency range of 1 MHz or more, particularly up to 3 MHz. The Zn content is more preferably 5-8% by mol (calculated as ZnO).

The Curie temperature (Tc) calculated from the percentages by mol of $Fe_2O_3$ and ZnO is in a practically acceptable temperature range of 250-330° C., when the Fe content and the Zn content are within the above ranges.

The MnZn ferrite contains at least Co as a sub-component. Like $Fe^{2+}$, $Co^{2+}$ controls the temperature providing the minimum core loss, as metal ions having a positive crystal magnetic anisotropy constant K1. Because $Co^{2+}$ has a larger crystal magnetic anisotropy constant K1 than that of $Fe^{2+}$, it is an effective element for improving the temperature dependency of core loss. Too small an amount of $Co^{2+}$ less improves the temperature dependency, while too large an amount of $Co^{2+}$ extremely increases loss in a low temperature range, both practically undesirable. When the Co content is 0.05-0.4 parts by mass (calculated as $Co_3O_4$) per 100 parts by mass in total of the main components (calculated as the oxides), $Fe^{2+}$ and $Co^{2+}$ ions are rearranged by the heat treatment to control induced magnetic anisotropy. As a result, core loss can be further reduced in a practical temperature range, improving the temperature dependency. The Co content is more preferably 0.1-0.3 parts by mass (calculated as $Co_3O_4$).

Ca and Si are preferably contained as sub-components. Si is segregated in grain boundaries to increase grain boundary resistance, thereby reducing eddy current loss, and thus reducing core loss in a high frequency range. If the amount of Si is too small, Si would not provide sufficient increase in grain boundary resistance. On the other hand, if the amount of Si is too large, Si would induce the excessive growth of crystal grains, resulting in larger core loss. When the Si content is 0.003-0.015 parts by mass (calculated as $SiO_2$) per 100 parts by mass in total of the main components (calculated as the oxides), sufficient grain boundary resistance for reducing eddy current loss can be secured, resulting in low loss in a high frequency range of 1 MHz or more. The Si content is more preferably 0.005-0.01 parts by mass (calculated as $SiO_2$).

Like Si, Ca is segregated in grain boundaries, increasing grain boundary resistance and reducing eddy current loss, thereby reducing core loss in a high frequency range. Too small an amount of Ca less increases grain boundary resistance, while too large an amount of Ca makes crystals larger, resulting in larger core loss. When the Ca content is 0.06-0.3 parts by mass (calculated as $CaCO_3$) per 100 parts by mass in total of the main components (calculated as the oxides), sufficient grain boundary resistance for reducing eddy current loss can be secured, resulting in low loss in a high frequency range of 1 MHz or more. The Ca content is more preferably 0.06-0.2 parts by mass (calculated as $CaCO_3$).

V, Nb or Ta, a 5a-group metal, may be contained as a sub-component. The 5a-group metal is at least one selected from the group consisting of V, Nb and Ta. The 5a-group metal is segregated in the form of oxide in grain boundaries together with Si and Ca, providing grain boundaries with higher resistance, thereby further reducing core loss.

V has a lower melting point than those of Nb and Ta, with a function of accelerating the growth of crystal grains. Because of a lower melting point than those of other 5a-group metals, V appears to have good wettability with grain boundaries, improving the machinability of the sintered body, thereby suppressing cracking, etc. Too large an amount of V induces excessive growth of crystals, resulting in high core loss. When the V content is 0-0.1 parts by mass (calculated as $V_2O_5$) per 100 parts by mass in total of the main components (calculated as the oxides), sufficient grain boundary resistance for reducing eddy current loss can be secured, resulting in low loss in a high frequency range of 1 MHz or more. The V content is more preferably 0-0.05 parts by mass (calculated as $V_2O_5$).

Nb and/or Ta suppress the growth of crystal grains, providing a uniform crystal structure, and reducing core loss. With higher melting points than that of V, Nb and Ta prevent the melting point of the sintered body from being lowered by oxides of Fe, Ca and Si. With too large amounts, Nb and Ta are segregated in crystal grains, resulting in higher core loss. When the total amount of Nb (calculated as $Nb_2O_5$) and Ta (calculated as $Ta_2O_5$) is 0-0.3 parts by mass per 100 parts by mass in total of the main components (calculated as the oxides), sufficient grain boundary resistance for reducing eddy current loss can be secured, resulting in low loss in a high frequency range of 1 MHz or more. Further, Nb and Ta reduce hysteresis loss and residual loss particularly at a high temperature (100° C.) among core loss after heat treatment, effective to achieve low high-frequency loss in a wide temperature range. The total amount of Nb (calculated as $Nb_2O_5$) and Ta (calculated as $Ta_2O_5$) is more preferably 0-0.2 parts by mass.

The Ta content (calculated as $Ta_2O_5$) is preferably 0-0.1 parts by mass, more preferably 0-0.05 parts by mass. The Nb content (calculated as $Nb_2O_5$) is preferably 0.05 parts or less by mass (not including 0), more preferably 0.01-0.04 parts by mass.

(2) Properties

The MnZn ferrite preferably has an average crystal grain size of 2-5 μm. The average crystal grain size of 5 μm or less leads to low eddy current loss, and low residual loss because of fewer magnetic walls, resulting in low core loss in a high frequency range. However, when the average crystal grain size is less than 2 μm, grain boundaries act as pining sites of magnetic walls, and decrease in permeability and increase in core loss are induced by a demagnetizing field. When the average crystal grain size exceeds 5 μm, eddy current loss tends to increase, resulting in higher core loss in a high frequency range of 1 MHz or more.

[2] Production Method (1) Molding Step

The raw material powder for the MnZn ferrite comprises $Fe_2O_3$ powder, $Mn_3O_4$ powder and ZnO powder as main components, and $Co_3O_4$ powder, $SiO_2$ powder, $CaCO_3$ powder, etc. as sub-components. A green body to be sintered is formed by granules, which are obtained by mixing calcined powder of main component raw materials with sub-component raw materials, pulverizing them to a predetermined average particle size, and adding a binder such as polyvinyl alcohol to the resultant mixture. $Co_3O_4$ may be added together with the main component raw materials before calcining. The binder is an organic material substantially decomposed in the temperature-elevating step, but its carbon may remain after sintering depending on the conditions, likely deteriorating magnetic properties. Accordingly, the timing of switching to a low-oxygen-concentration atmosphere is desirably adjusted such that the binder is sufficiently decomposed.

(2) Sintering Step

The MnZn ferrite core can be obtained by sintering a green body of MnZn ferrite raw material powder. The sintering comprises a temperature-elevating step, a high-temperature-keeping step, and a cooling step. In the high-temperature-keeping step, the keeping temperature is preferably higher than 1050° C. and lower than 1150° C., and the concentration of oxygen in the atmosphere is preferably 0.4-2% by volume. In the cooling step, a cooling speed from at least (Tc+70)° C. to 100° C. is preferably 50° C./hour or more, and a cooling speed from the keeping temperature to 100° C. is preferably 50° C./hour or more.

(a) Temperature-Elevating Step

In the temperature-elevating step, the concentration of oxygen in the atmosphere is preferably in a range of 0.4-2% by volume, at least at 900° C. or higher. By controlling the concentration of oxygen at a temperature of 900° C. or higher, at which the formation of ferrite starts, a higher-density sintered body can be obtained.

(b) High-Temperature-Keeping Step

When the keeping temperature in the high-temperature-keeping step is 1050° C. or lower, a sufficient sintering density cannot be achieved, likely resulting in a structure containing many fine crystals and pores. Though sintering is accelerated at a keeping temperature of 1150° C. or higher, relatively large crystal grains tend to be formed, resulting in increased eddy current loss. Thus, the core loss tends to be larger with the keeping temperature outside the above range in the high-temperature-keeping step. Excessive growth of crystals can be suppressed by lowering the keeping temperature to lower than 1150° C. in the high-temperature-keeping step, thereby suppressing increase in eddy current loss. In the present invention, the keeping temperature in the high-temperature-keeping step is preferably 1060-1140° C., more preferably 1070-1130° C.

When the concentration of oxygen in the high-temperature-keeping step is less than 0.4% by volume, the atmosphere is reductive, providing a sintered MnZn ferrite with lowered resistance and increased eddy current loss. On the other hand, when the concentration of oxygen is more than 2% by volume, the atmosphere is too oxidative, likely forming low-resistance hematite and relatively large crystal grains, with partial growth of crystals. It leads to larger eddy current loss, tending to increase core loss at a high frequency and high exciting magnetic flux density, in an entire temperature range from a low temperature to a high temperature (between 0° C. and 120° C.).

The concentration of oxygen is preferably set depending on the keeping temperature; the higher the keeping temperature, the higher the concentration of oxygen. With the concentration of oxygen set depending on the keeping temperature, Ca is segregated in crystal grain boundaries to provide high grain boundary resistance, thereby reducing core loss.

The amount of $Fe^{2+}$ having a positive crystal magnetic anisotropy constant tends to increase as the concentration of oxygen is lowered, resulting in a lower temperature providing the minimum core loss. Accordingly, the concentration of oxygen is preferably set within the above range.

(c) Cooling Step

In the cooling step subsequent to the high-temperature-keeping step, the concentration of oxygen in the atmosphere is lowered from the level in the high-temperature-keeping step to such a level as to avoid excessive oxidation and reduction. With the oxygen concentration of 0.001-0.2% by volume in the atmosphere in a temperature range from 900° C. to 400° C., the amount of $Fe^{2+}$ formed can be adjusted in a preferred range. A period between 900° C. and 400° C. until the atmosphere is adjusted to have a predetermined oxygen concentration in the cooling step subsequent to the high-temperature-keeping step is called "first cooling step."

In the cooling step subsequent to the high-temperature-keeping step, too, the concentration of oxygen is adjusted to the above range, causing the segregation of Ca in the grain boundaries of MnZn ferrite, and properly controlling the amount of Ca dissolved in crystal grains, thereby increasing resistance in crystal grains and grain boundaries, and thus reducing core loss due to eddy current loss.

The cooling speed in the first cooling step is not particularly restricted, as long as the temperature and the concentration of oxygen in a sintering furnace are in adjustable ranges, but it is preferably 50-300° C./hour. When the cooling speed in the first cooling step is less than 50° C./hour, the sintering step needs a long time, resulting in a long residing time in the sintering furnace, undesirably leading to lower productivity and higher cost. On the other hand, when the cooling speed is more than 300° C./hour, it may be difficult to keep the temperature and the concentration of oxygen uniform in the sintering furnace, though depending on the capacity of the sintering furnace.

With the keeping temperature and the concentration of oxygen set in predetermined ranges in the high-temperature-keeping step, and with the concentration of oxygen controlled in a predetermined range during cooling from 900° C. to 400° C. in the first cooling step, the unevenness of crystal grain sizes can be suppressed, and the amounts of $Co^{2+}$ and $Fe^{2+}$ ions can be controlled to proper levels, thereby reducing core loss.

In the cooling step, the cooling speed from (Tc+70)° C. to 100° C. is preferably 50° C./hour to 300° C./hour, wherein Tc is a Curie temperature (° C.) calculated from % by mol of iron oxide ($Fe_2O_3$) and zinc oxide (ZnO), main components of the MnZn ferrite. Typically, the cooling speed from 400° C. to 100° C. is desirably 50° C./hour to 300° C./hour. In the cooling step, a period of cooling at a predetermined cooling speed in a temperature range from (Tc+70)° C. to 100° C., inclusive of Tc, is called "second cooling step."

The cooling speed of less than 50° C./hour in the second cooling step is not preferable, because of large influence of induced magnetic anisotropy due to $Co^{2+}$ and $Fe^{2+}$, and high core loss at high temperatures. On the other hand, with the cooling speed of more than 300° C./hour, it may be difficult to control the temperature and the cooling speed in the sintering furnace, though depending on the sintering furnace.

The atmosphere in the second cooling step may be an inert gas or air. The atmosphere having the oxygen concentration controlled in the first cooling step may not be changed, or may be changed to air or an inert gas in the course of the second cooling step.

Because the MnZn ferrite core produced by the method of the present invention is suitably used typically at a frequency of 1-5 MHz and an exciting magnetic flux density of 25-75 mT, the cooling speed between (Tc+70)° C. and 100° C. in the second cooling step is preferably controlled to 50° C./hour to 300° C./hour to exhibit small core loss in the above ranges of a frequency and an exciting magnetic flux density. The control of the cooling speed to 50° C./hour to 300° C./hour in the second cooling step makes it possible to obtain MnZn ferrite core having adjusted induced magnetic anisotropy and reduced residual loss and hysteresis loss, thereby exhibiting suppressed core loss in a desired exciting magnetic flux density and a wide temperature range.

The sintered body of MnZn ferrite thus produced can have core loss Pcv of less than 4000 $kW/m^3$ between 0° C. and 120° C., at a frequency of 2 MHz and an exciting magnetic flux density of 50 mT. The sintered body subjected to a heat treatment described later can have further reduced core loss.

(4) Heat Treatment Step

In the heat treatment step, the sintered body of MnZn ferrite is heated to a temperature of 200° C. or higher and between (Tc−90)° C. and (Tc+100)° C., wherein Tc is the Curie temperature of the MnZn ferrite, namely a temperature meeting Condition 1 of 200° C. or higher, and Condition 2 of (Tc−90)° C. to (Tc+100)° C.; kept at such a temperature for a predetermined period of time; and cooled from the keeping temperature at a speed of 50° C./hour or less. When the keeping temperature is lower than 200° C. or lower than (Tc−90)° C., it is difficult to obtain the effect of the present invention for reducing core loss. When the keeping temperature is higher than (Tc+100)° C., the effect of reducing core loss is saturated. With the cooling speed of more than 50° C./hour from the keeping temperature, the effect of reducing core loss cannot be sufficiently exhibited.

The heat treatment may be conducted in the air or in a reducing atmosphere. When the oxidizing atmosphere such as air is used, the heat treatment temperature is preferably 400° C. or lower to prevent the deterioration of the magnetic properties of MnZn ferrite by oxidation. When the cooling speed is as low as about 5° C./hour, the heat treatment temperature is preferably lower than 350° C. When the reducing atmosphere is used, the upper limit of the heat treatment temperature is not limited by oxidation, but it is preferably 400° C. or lower, as in the heat treatment in an oxidizing atmosphere, taking into account the effect of reducing core loss.

With a heat treatment conducted on the sintered body of MnZn ferrite under the above conditions, the sintered body can have core loss Pcv of less than 1500 $kW/m^3$ between 0° C. and 120° C., at a frequency of 2 MHz and an exciting magnetic flux density of 50 mT.

The temperature-elevating speed in the heat treatment is not particularly restricted, but may be typically 100° C./hour to 300° C./hour, taking into consideration the performance of the apparatus and strain due to thermal stress.

The keeping time in the heat treatment is not particularly restricted, but may be a time period necessary for elevating the temperature of cores in the apparatus to a predetermined level, typically about 1 hour.

The heat treatment of the present invention can be conducted in a heat treatment furnace such as an electric furnace, a constant-temperature chamber, etc.

EXAMPLES

The present invention will be explained in further detail by Examples below, without intention of restriction.

Raw material powders for MnZn ferrite having the compositions A, B, C, D, E and F shown in Table 1 were prepared. The raw materials for main components comprising $Fe_2O_3$, $Mn_3O_4$ (calculated as MnO) and ZnO were wet-mixed, dried, and calcined at 900° C. for 2 hours. Next, $Co_3O_4$, $SiO_2$, $CaCO_3$, $V_2O_5$, $Ta_2O_5$ and $Nb_2O_5$ in amounts shown in Table 1 were added to 100 parts by mass of each calcined powder in a ball mill, and pulverized and mixed to an average particle size (air permeability method) of 0.8-1.0 µm. The resultant mixture was mixed with polyvinyl alcohol as a binder, granulated by a spray drier, and molded by pressing at 196 MPa to obtain a ring-shaped green body. The green body was sintered in an atmosphere-adjustable, electric furnace, to obtain a sintered body having an outer diameter of 14 mm, an inner diameter of 7 mm and a thickness of 5 mm.

TABLE 1

| Material Composition | Main Components (% by mol) [1] | | | Sub-Components (parts by mass) [2] | | | | | |
|---|---|---|---|---|---|---|---|---|---|
| | $Fe_2O_3$ | ZnO | MnO | $Co_3O_4$ | $CaCO_3$ | $SiO_2$ | $V_2O_5$ | $Ta_2O_5$ | $Nb_2O_5$ |
| A | 54.5 | 6.8 | Bal. | 0.19 | 0.12 | 0.005 | 0.02 | 0 | 0.03 |
| B | 54.5 | 6.8 | Bal. | 0.19 | 0.12 | 0.005 | 0.02 | 0.10 | 0 |
| C | 54.5 | 6.8 | Bal. | 0.19 | 0.12 | 0.005 | 0.02 | 0 | 0 |
| D | 54.5 | 6.8 | Bal. | 0.19 | 0.12 | 0.005 | 0 | 0 | 0 |
| E | 54.5 | 6.8 | Bal. | 0.19 | 0.12 | 0.005 | 0 | 0 | 0.03 |
| F | 54.5 | 6.8 | Bal. | 0.19 | 0.12 | 0.005 | 0 | 0.03 | 0.02 |

Note:
[1] $Mn_3O_4$ was used as a raw material for Mn, but calculated as MnO to determine the composition of main components.

Note:
[2] The amount per 100 parts by mass of the calcined powder of main components.

Figure 2:
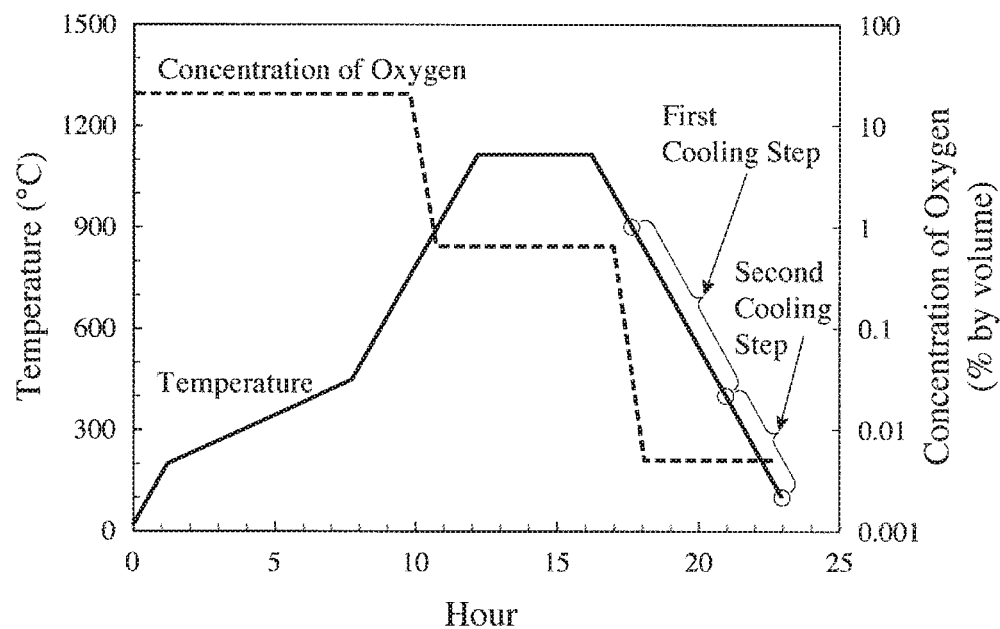
FIG. 2 is a graph showing temperature conditions in a sintering step according to an embodiment of the present invention.

FIG. 2 shows temperature conditions in the sintering step. The sintering was conducted in the air in the temperature-elevating step from room temperature to 750° C.; the substitution of the air by an $N_2$ gas started at 750° C. to gradually lower the concentration of oxygen to 0.65% by volume at 900° C.; and the temperature was elevated at a speed of 130° C./hour to a temperature of 1115° C., which was set in the high-temperature-keeping step. In the high-temperature-keeping step, the concentration of oxygen was 0.65% by volume. In the cooling step, the concentration of oxygen was gradually lowered in a range from 1000° C. to 850° C., to 0.65% by volume at 1000° C., 0.05% by volume at 900° C., and 0.005% by volume at 850° C. or lower. In the cooling step, after cooled to 100° C. at a speed of 150° C./hour, each core was taken out of the electric sintering furnace. The concentration of oxygen was measured by a zirconia-type oxygen analyzer, and the temperature was measured by a thermocouple attached to the sintering furnace.

Each sintered body was evaluated with respect to core loss Pcv, saturation magnetic flux density Bs, initial permeability μi, average crystal grain size, and Curie temperature Tc, by the following methods.

Core Loss Pcv

A sinusoidal, alternating magnetic field having a frequency of 2 MHz and an exciting magnetic flux density of 50 mT was applied to each core having a 3-turn primary winding and a 3-turn secondary winding, to measure its core loss Pcv every 20° C. between 0° C. and 120° C. by a B-H analyzer (SY-8232 available from Iwatsu Electric Co., Ltd.). A temperature providing the minimum core loss Pcv between 0° C. and 120° C. was calculated from the measurement results by a least-squares method using a polynomial expression.

Saturation Magnetic Flux Density Bs

A magnetic field of 1.2 kA/m was applied to each core having a 10-turn primary winding and a 10-turn secondary winding, to measure its saturation magnetic flux density (Bs) at 20° C. by a DC magnetization meter (SK-110 available from Metron Co. Ltd.).

Initial Permeability μi

A magnetic field of 0.4 A/m was applied to each core having a 10-turn winding, to measure its initial permeability μi at 20° C. and 100 kHz by HP-4284A available from Hewlett-Packard.

Average Crystal Grain Size

A mirror-polished core was thermally etched at 950-1050° C. for 1 hour in $N_2$, and a photograph of its surface was taken by an optical or scanning electron microscope (2000 times), to calculate the average crystal grain size in a rectangular region of 60 μm×40 μm of this photograph by a quadrature method (corresponding to JIS H0501-1986). When a sufficient number (300 or more) of particles could not be counted depending on crystal grain sizes, the region was properly expanded to observe 300 or more particles.

Curie Temperature

The Curie temperature was calculated by the formula described in "Ferrite" (6th issue, page 79, Nov. 30, 1986, published by Maruzen):

$$Tc=12.8\times[X-(2/3)\times Z]-358(° C.),$$

wherein X and Z are the percentages by mol of $Fe_2O_3$ and ZnO, respectively.

The core loss Pcv, the temperature providing the minimum core loss Pcv, the saturation magnetic flux density Bs, the initial permeability μi, the average crystal grain size, and the Curie temperature Tc, which were measured above, are shown in Tables 2-1 and 2-2.

TABLE 2-1

| Sample | Material | Core Loss (kW/m³) at 2 MHz and 50 mT | | | | | | |
|---|---|---|---|---|---|---|---|---|
| No. | Composition | 0° C. | 20° C. | 40° C. | 60° C. | 80° C. | 100° C. | 120° C. |
| 1 | A | 1460 | 1310 | 1235 | 1245 | 1405 | 1735 | 2230 |
| 2 | B | 1430 | 1340 | 1330 | 1400 | 1610 | 2025 | 2590 |
| 3 | C | 1750 | 1690 | 1740 | 1870 | 2180 | 2750 | 3535 |
| 4 | D | 1835 | 1775 | 1825 | 1960 | 2330 | 3025 | 3990 |
| 5 | E | 1530 | 1375 | 1295 | 1305 | 1435 | 1700 | 2120 |
| 6 | F | 1505 | 1350 | 1270 | 1255 | 1420 | 1755 | 2275 |

TABLE 2-2

| Sample No. | Minimum-Core-Loss Temp. (° C.)[1] | Bs (mT) | Initial Permeability (μi) | Curie Temperature (° C.) | Average Crystal Grain Size (μm) |
|---|---|---|---|---|---|
| 1 | 46 | 535 | 1165 | 282 | 3.6 |
| 2 | 34 | 531 | 1030 | 282 | 3.5 |
| 3 | 25 | 532 | 1105 | 282 | 3.5 |
| 4 | 27 | 525 | 1050 | 282 | 2.7 |
| 5 | 48 | 536 | 1170 | 282 | 3.4 |
| 6 | 47 | 535 | 1170 | 282 | 3.6 |

Note:
[1]The temperature at which the minimum core loss was obtained.

As is clear from Table 2, any sintered bodies exhibited core loss Pcv of less than 4000 kW/m³ between 0° C. and 120° C.

Examples 1-6

The sintered bodies of Samples 1-6 produced by the material compositions A-F shown in Table 1 were heat-treated as described below to obtain MnZn ferrite cores. FIG. 1 shows the temperature conditions of the heat treatment step in Example 1. As shown in Table 3-1, the heat treatment was conducted by elevating the temperature from room temperature to 250° C. over 1.5 hours, keeping that temperature for 1 hour to stabilize the temperature in the furnace, lowering the temperature to 150° C. at a cooling speed of 5° C./hour, and introducing air into the furnace from outside to cool the samples after the temperature became lower than 150° C. The heat treatment was conducted in the air.

Examples 7 and 8

As shown in Table 3-1, the MnZn ferrite cores of Examples 7 and 8 were produced in the same manner as in Example 1, except for changing the cooling speed in the heat treatment to 10° C./hour and 20° C./hour, respectively.

Comparative Example 1

A MnZn ferrite core was produced from the sintered body of Sample 1 produced by using the material composition A shown in Table 1 in the same manner as in Example 1, except for changing the heat treatment conditions as described below. As shown in Table 3-1, the heat treatment was conducted by elevating the temperature from room temperature to 250° C. over 1.5 hours, keeping that temperature for 21 hours, and cooling the sample by introducing air into the furnace from outside without using the above cooling step.

Comparative Examples 2 and 3

As shown in Table 3-1, the MnZn ferrite cores of Comparative Examples 2 and 3 were produced in the same manner as in Comparative Example 1, except for changing the keeping time in the heat treatment to 11 hours and 6 hours, respectively.

Figure 3:
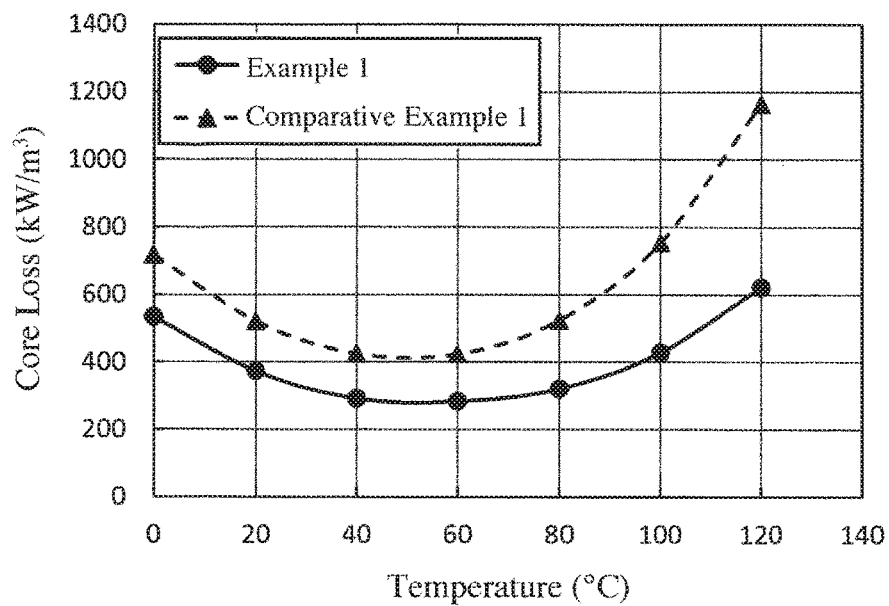
FIG. 3 is a graph showing the temperature characteristics of core losses of the MnZn ferrite cores of Example 1 and Comparative Example 1 at a frequency of 2 MHz and an exciting magnetic flux density of 50 mT.

The magnetic properties, etc. of the resultant cores are shown in Tables 3-2 and 3-3, and the temperature characteristics of core loss in Example 1 and Comparative Example 1 are shown in FIG. 3. The magnetic properties, etc. were evaluated by the same methods as described above. The core loss change ratio by heat treatment was determined as described below at each temperature of 20° C., 60° C. and 100° C. The effects of slow cooling after the heat treatment in Examples and Comparative Examples were compared between samples having the same sum of the keeping time and the cooling time, namely between Example 1 and Comparative Example 1, between Example 7 and Comparative Example 2, and between Example 8 and Comparative Example 3.

Core Loss Change Ratio

The core loss change ratio can be determined by the formula 1 of $Ps=[(Pcv1-Pcv2)/Pcv1] \times 100$, wherein Pcv1 represents the core loss of Sample 1, and Pcv2 represents the core loss of the heat-treated core. At each temperature of 20° C., 60° C. and 100° C., the core loss change ratio was determined as Ps20, Ps60 and Ps100, respectively.

TABLE 3-1

| | | Heat Treatment Conditions | | | | |
| | | Temperature Keeping | | Cooling | | Temperature-Keeping Time + |
| No. | Comp.[1] | Temp. (° C.) | Time (hour) | Speed (° C./hour) | Time (hour) | Cooling Time [2] (hour) |
| --- | --- | --- | --- | --- | --- | --- |
| Example 1 | A | 250 | 1 | 5 | 20 | 21 |
| Example 2 | B | 250 | 1 | 5 | 20 | 21 |
| Example 3 | C | 250 | 1 | 5 | 20 | 21 |
| Example 4 | D | 250 | 1 | 5 | 20 | 21 |
| Example 5 | E | 250 | 1 | 5 | 20 | 21 |
| Example 6 | F | 250 | 1 | 5 | 20 | 21 |
| Example 7 | A | 250 | 1 | 10 | 10 | 11 |
| Example 8 | A | 250 | 1 | 20 | 5 | 6 |
| Com. Ex. 1 | A | 250 | 21 | — | — | 21 |
| Com. Ex. 2 | A | 250 | 11 | — | — | 11 |
| Com. Ex. 3 | A | 250 | 6 | — | — | 6 |

Note:
[1] The composition of each material.

[2] A time period until air was introduced into the furnace from outside through a cooling step after reaching the keeping temperature. It is equal to the keeping time in Comparative Examples 1-3 because of no cooling step.

(2) A time period until air was introduced into the furnace from outside through a cooling step after reaching the keeping temperature. It is equal to the keeping time in Comparative Example 1-3 because of no cooling step.

TABLE 3-2

| No. | Comp.[1] | Core Loss (kW/m³) at 2 MHz and 50 mT | | | | | | |
|---|---|---|---|---|---|---|---|---|
| | | 0° C. | 20° C. | 40° C. | 60° C. | 80° C. | 100° C. | 120° C. |
| Example 1 | A | 535 | 375 | 295 | 285 | 320 | 430 | 625 |
| Example 2 | B | 550 | 395 | 320 | 315 | 370 | 515 | 750 |
| Example 3 | C | 695 | 485 | 425 | 440 | 500 | 685 | 995 |
| Example 4 | D | 730 | 510 | 445 | 465 | 535 | 770 | 1145 |
| Example 5 | E | 560 | 395 | 310 | 300 | 330 | 435 | 615 |
| Example 6 | F | 550 | 380 | 300 | 290 | 325 | 440 | 635 |
| Example 7 | A | 460 | 385 | 340 | 330 | 380 | 590 | 895 |
| Example 8 | A | 635 | 530 | 470 | 450 | 525 | 765 | 1100 |
| Com. Ex. 1 | A | 720 | 520 | 425 | 425 | 525 | 755 | 1165 |
| Com. Ex. 2 | A | 980 | 795 | 695 | 700 | 850 | 1145 | 1625 |
| Com. Ex. 3 | A | 1175 | 950 | 830 | 840 | 1020 | 1375 | 1950 |

Note:
[1]The composition of each material.

TABLE 3-3

| No. | Material Composition | Initial Permeability ($\mu_i$) | Ps20 (%) | Ps60 (%) | Ps100 (%) |
|---|---|---|---|---|---|
| Example 1 | A | 850 | 71 | 77 | 75 |
| Example 2 | B | 755 | 71 | 78 | 75 |
| Example 3 | C | 805 | 71 | 76 | 75 |
| Example 4 | D | 765 | 71 | 76 | 75 |
| Example 5 | E | 820 | 71 | 77 | 67 |
| Example 6 | F | 815 | 72 | 77 | 65 |
| Example 7 | A | 880 | 71 | 74 | 66 |
| Example 8 | A | 965 | 60 | 64 | 56 |
| Com. Ex. 1 | A | 990 | 60 | 66 | 56 |
| Com. Ex. 2 | A | 1105 | 39 | 44 | 34 |
| Com. Ex. 3 | A | 1160 | 27 | 33 | 21 |

As is clear from Tables 3-1, 3-2 and 3-3, the MnZn ferrite cores of Examples 1-6 obtained by the production method of the present invention exhibited low core loss in any compositions, indicating that they were low-loss MnZn ferrite cores in a wide temperature range. Though V, Ta and Nb are not indispensable as sub-components, but properly adding Nb or Ta and Nb further reduced core loss.

As is clear from Tables 3-1, 3-2 and 3-3, and FIG. 3, the core loss was lower in Examples 1, 7 and 8 of the present invention than in corresponding Comparative Examples 1-3, indicating that the former were low-loss MnZn ferrite cores in a wide temperature range. These results verify that in the heat treatment, slower cooling in Examples 1, 7 and 8 of the present invention is more effective than longer keeping time in Comparative Examples 1-3 in reducing the core loss in a wide temperature range. This is a novel discovery in the present invention.

Though a phenomenon of reducing core loss by slow cooling has not been made clear, it may be presumed that a magnetic core with stabilized rearrangement of $Co^{2+}$ ions and $Fe^{2+}$ ions affecting induced magnetic anisotropy can be obtained by rapidly cooling a sintered body with the influence of induced magnetic anisotropy suppressed in the sintering step, heat-treating the resultant core in a predetermined temperature range, and slowly cooling the core from that temperature range. Further, the addition of proper amounts of Nb/Ta can reduce hysteresis loss and residual loss at a high temperature, providing the MnZn ferrite core with suppressed core loss in a wide temperature range.

A core obtained through a sintering step with a cooling speed of 50° C./hour or more was heat-treated by heating the core to a temperature of 200° C. or higher and Tc−90° C. to Tc+100° C., wherein Tc is a Curie temperature of the MnZn ferrite, and cooling the core from that temperature range at a cooling speed of 50° C./hour or less, to adjust its induced magnetic anisotropy, reducing residual loss and hysteresis loss, thereby providing the MnZn ferrite core with suppressed core loss in a wide temperature range at a desired exciting magnetic flux density. This presumably further reduces core loss than the conventional technology.

Comparative Example 4

A green body formed from the material composition A shown in Table 1 in the same manner as in Example 1 was sintered in an atmosphere-adjustable, electric sintering furnace, to obtain a sintered body having an outer diameter of 14 mm, an inner diameter of 7 mm and a thickness of 5 mm. The temperature conditions of the sintering step were the same as shown in FIG. 2 in the temperature elevation step, the high-temperature-keeping step and the first cooling step, but differed only in the second cooling step, in which cooling from 250° C. to 150° C. was conducted at a speed of 5° C./hour. After confirming that the temperature in the sintering furnace became lower than 150° C., the core was taken out of the electric sintering furnace and rapidly cooled. The resultant core was not heat-treated. The magnetic properties, etc. of the core are shown in Tables 4-1 and 4-2 together with those of Example 1.

TABLE 4-1

| | Core Loss (kW/m³) at 2 MHz and 50 mT | | | | | | |
|---|---|---|---|---|---|---|---|
| No. | 0° C. | 20° C. | 40° C. | 60° C. | 80° C. | 100° C. | 120° C. |
| Example 1 | 535 | 375 | 295 | 285 | 320 | 430 | 625 |
| Com. Ex. 4 | 920 | 790 | 760 | 820 | 975 | 1235 | 1585 |

TABLE 4-2

| No. | Initial Permeability ($\mu i$) | Ps20 (%) | Ps60 (%) | Ps100 (%) |
|---|---|---|---|---|
| Example 1 | 850 | 71 | 77 | 75 |
| Com. Ex. 4 | 875 | 40 | 39 | 53 |

As is clear from Tables 4-1 and 4-2, Example 1 of the present invention exhibited a larger core loss change ratio than in Comparative Example 4 at any temperatures, providing a MnZn ferrite core having low loss in a wide temperature range. This result indicates that in Comparative Example 4, in which slow cooling started in the course of the cooling step in the sintering step, the core was cooled in an unstable state, failing to sufficiently reduce loss.

Examples 9-13, and Comparative Example 5

The MnZn ferrite cores of Examples 9-13 and Comparative Example 5 were produced in the same manner as in Example 1, except for changing the keeping temperature and the cooling speed in the heat treatment as shown in Table 5-1. The cooling of each sample was conducted to 150° C., and subsequently each sample was cooled by air introduced into the furnace from outside. In Comparative Example 5, cooling was not conducted because the keeping temperature was 150° C., but the sample was cooled by air introduced into the furnace from outside 1 hour after passing the keeping time. Their magnetic properties, etc. were evaluated by the same methods as described above. The magnetic properties, etc. of the cores are shown in Tables 5-2 and 5-3.

TABLE 5-1

| | Heat Treatment Conditions | | |
|---|---|---|---|
| No. | Keeping Temperature (° C.) | Keeping Time (hour) | Cooling Speed (° C./hour) |
| Com. Ex. 5 | 150 | 1 | — |
| Example 9 | 200 | 1 | 5 |
| Example 10 | 225 | 1 | 5 |
| Example 1 | 250 | 1 | 5 |
| Example 11 | 275 | 1 | 5 |
| Example 12 | 300 | 1 | 5 |
| Example 13 | 325 | 1 | 5 |

TABLE 5-2

| | Core Loss (kW/m³) at 2 MHz and 50 mT | | | | | | |
|---|---|---|---|---|---|---|---|
| | 0° C. | 20° C. | 40° C. | 60° C. | 80° C. | 100° C. | 120° C. |
| Com. Ex. 5 | 1450 | 1300 | 1230 | 1240 | 1400 | 1730 | 2215 |
| Example 9 | 900 | 650 | 555 | 560 | 660 | 830 | 1110 |
| Example 10 | 740 | 520 | 390 | 360 | 420 | 595 | 990 |
| Example 1 | 535 | 375 | 295 | 285 | 320 | 430 | 625 |
| Example 11 | 495 | 355 | 300 | 300 | 350 | 465 | 665 |
| Example 12 | 365 | 285 | 265 | 295 | 360 | 490 | 750 |
| Example 13 | 385 | 300 | 320 | 405 | 530 | 760 | 1200 |

TABLE 5-3

| No. | Initial Permeability ($\mu i$) | Ps20 (%) | Ps60 (%) | Ps100 (%) |
|---|---|---|---|---|
| Com. Ex. 5 | 1160 | 0.7 | 0.3 | 0.6 |
| Example 9 | 1045 | 50 | 55 | 52 |
| Example 10 | 975 | 60 | 71 | 66 |
| Example 1 | 850 | 71 | 77 | 75 |
| Example 11 | 825 | 73 | 76 | 73 |
| Example 12 | 775 | 78 | 76 | 72 |
| Example 13 | 720 | 77 | 68 | 56 |

Examples 14-16, and Reference Example 1

The MnZn ferrite cores of Examples 14-16 and Reference Example 1 were produced in the same manner as in Example 1, except for changing the keeping temperature and the cooling speed in the heat treatment as shown in Table 6-1, and except for conducting the heat treatment not in the air but in $N_2$. The cooling of each sample was conducted to 150° C., and subsequently each sample was cooled by air introduced into the furnace from outside. Their magnetic properties, etc. were evaluated by the same methods as described above. The magnetic properties, etc. of the cores are shown in Tables 6-2 and 6-3.

TABLE 6-1

| No. | Keeping Temperature (° C.) | Keeping Time (hour) | Cooling Speed (° C./hour) |
| --- | --- | --- | --- |
| Example 14 | 250 | 1 | 5 |
| Example 15 | 300 | 1 | 5 |
| Example 16 | 350 | 1 | 5 |
| Ref. Ex. 1 | 400 | 1 | 5 |

Heat Treatment Conditions

TABLE 6-2

| No. | Core Loss (kW/m$^3$) at 2 MHz and 50 mT | | | | | | |
| --- | --- | --- | --- | --- | --- | --- | --- |
|  | 0° C. | 20° C. | 40° C. | 60° C. | 80° C. | 100° C. | 120° C. |
| Example 14 | 530 | 370 | 290 | 280 | 320 | 425 | 615 |
| Example 15 | 535 | 375 | 295 | 275 | 320 | 430 | 635 |
| Example 16 | 670 | 495 | 395 | 355 | 370 | 455 | 630 |
| Ref. Ex. 1 | 615 | 460 | 370 | 350 | 385 | 480 | 680 |

TABLE 6-3

| No. | Initial Permeability (μi) | Ps20 (%) | Ps60 (%) | Ps100 (%) |
| --- | --- | --- | --- | --- |
| Example 14 | 840 | 72 | 77 | 76 |
| Example 15 | 815 | 71 | 78 | 75 |
| Example 16 | 750 | 62 | 72 | 74 |
| Ref. Ex. 1 | 765 | 65 | 72 | 72 |

As is clear from Tables 5-1, 5-2, 5-3, 6-1, 6-2 and 6-3, the effect of reducing core loss in the present invention was remarkably exhibited when the keeping temperature in the heat treatment was 200° C. or higher and (Tc−90)° C. to (Tc+100)° C., providing MnZn ferrite cores with low loss in a wide temperature range. Concerning the Curie temperature (Tc), the keeping temperature of lower than (Tc−90)° C. in the heat treatment makes it difficult to obtain the effect of the present invention for reducing core loss, while the keeping temperature of higher than (Tc+100)° C. saturates the effect of reducing core loss, providing no advantages from the aspect of energy consumption.

Examples 17-23, and Comparative Example 6

The core of Sample 2 produced from the material composition B shown in Table 1 in the same manner as in Example 1, except for changing the concentration of oxygen to 0.80% by volume and the keeping temperature to 1095° C. in the high-temperature-keeping step in the sintering step, was used in place of the core of Sample 1, to produce the MnZn ferrite cores of Examples 17-23 and Comparative Example 6 with the cooling speeds in the heat treatment changed as shown in Table 7-1. The cooling of each sample was conducted to 150° C., and subsequently each sample was cooled by air introduced into the furnace from outside. Their magnetic properties, etc. were evaluated by the same methods as described above. The magnetic properties, etc. of the cores are shown in Tables 7-2 and 7-3.

TABLE 7-1

| | Heat Treatment Conditions | | |
|---|---|---|---|
| No. | Keeping Temperature (° C.) | Keeping Time (hour) | Cooling Speed (° C./hour) |
| Com. Ex. 6 | 250 | 1 | 100 |
| Example 17 | 250 | 1 | 50 |
| Example 18 | 250 | 1 | 25 |
| Example 19 | 250 | 1 | 20 |
| Example 20 | 250 | 1 | 15 |
| Example 21 | 250 | 1 | 10 |
| Example 22 | 250 | 1 | 7.5 |
| Example 23 | 250 | 1 | 5 |

TABLE 7-2

| | Core Loss (kW/m³) at 2 MHz and 50 mT | | | | | | |
|---|---|---|---|---|---|---|---|
| No. | 0° C. | 20° C. | 40° C. | 60° C. | 80° C. | 100° C. | 120° C. |
| Com. Ex. 6 | 1185 | 1075 | 1025 | 995 | 1065 | 1265 | 1645 |
| Example 17 | 925 | 805 | 735 | 715 | 775 | 965 | 1295 |
| Example 18 | 770 | 660 | 600 | 565 | 615 | 760 | 1020 |
| Example 19 | 615 | 525 | 480 | 455 | 490 | 685 | 970 |
| Example 20 | 495 | 420 | 385 | 360 | 395 | 580 | 875 |
| Example 21 | 445 | 380 | 345 | 325 | 355 | 525 | 785 |
| Example 22 | 400 | 340 | 310 | 295 | 320 | 495 | 745 |
| Example 23 | 395 | 315 | 295 | 310 | 380 | 515 | 740 |

TABLE 7-3

| No. | Initial Permeability ($\mu_i$) | Ps20 (%) | Ps60 (%) | Ps100 (%) |
|---|---|---|---|---|
| Com. Ex. 6 | 1020 | 16 | 19 | 18 |
| Example 17 | 1020 | 37 | 42 | 37 |
| Example 18 | 930 | 49 | 54 | 51 |
| Example 19 | 855 | 59 | 63 | 56 |
| Example 20 | 810 | 67 | 71 | 62 |
| Example 21 | 775 | 71 | 74 | 66 |
| Example 22 | 765 | 73 | 76 | 68 |
| Example 23 | 755 | 76 | 75 | 67 |

As is clear from Tables 7-1, 7-2 and 7-3, the cooling speed of 50° C./hour or less in the heat treatment provided a remarkable effect of reducing core loss in the present invention, thereby providing a MnZn ferrite core with low loss in a wide temperature range.

Figure 4:
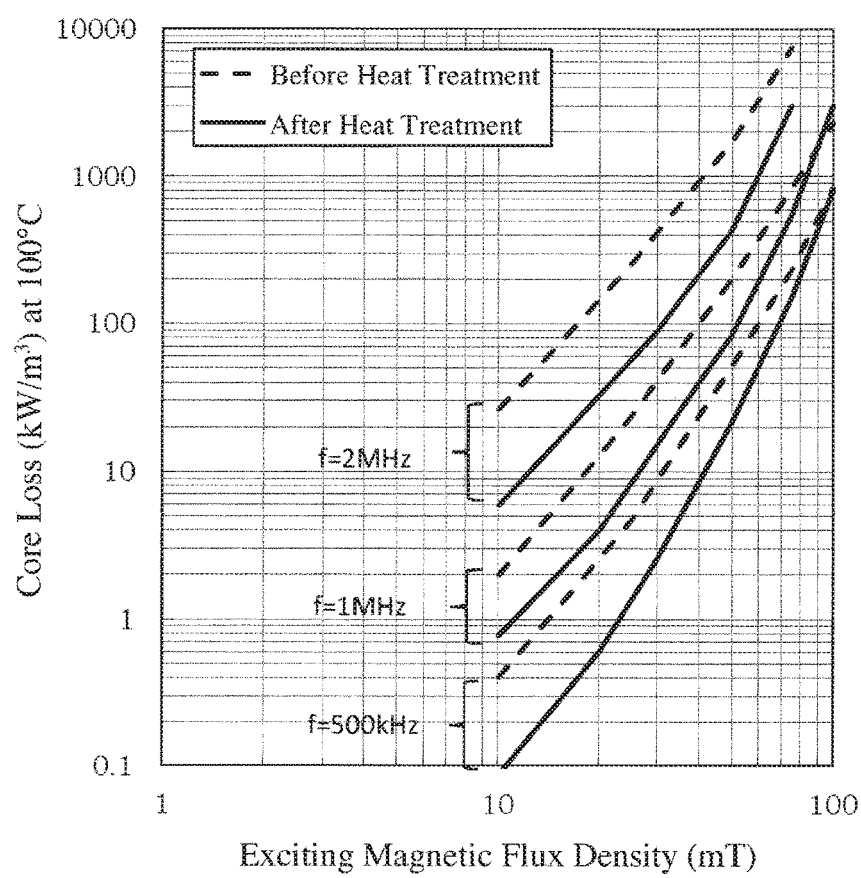
FIG. 4 is a graph showing the relation of core losses at 100° C. of the MnZn ferrite core of Example 1 before and after the heat treatment (after sintering) to an exciting magnetic flux density.

The core losses before and after the heat treatment in Example 1 were measured at frequencies of 500 kHz, 1 MHz and 2 MHz and exciting magnetic flux densities of 10 mT to 100 mT, at 100° C. The results are shown in FIG. 4. As is clear from FIG. 4, the heat-treated MnZn ferrite core of Example 1 within the present invention exhibited low loss at an exciting magnetic flux density of 75 mT or less, at any frequency of 500 kHz, 1 MHz and 2 MHz.

The core losses of the heat-treated MnZn ferrite cores of Examples 1-3 were measured at a frequency of 2 MHz and an exciting magnetic flux density of 50 mT, at 20° C., 60° C. and 100° C., and separated to hysteresis losses, eddy current losses and residual losses. The core loss Pc is a sum of hysteresis loss Ph, eddy current loss Pe, and residual loss Pr; Pc=Ph+Pe+Pr. The hysteresis loss Ph is proportional to the frequency (f), and the eddy current loss Pe is proportional to a square of the frequency (f), meeting the following equation:

$$Pc = Ph + Pe + Pr = \alpha \times f + \beta \times f^2 + Pr,$$

wherein α and β are coefficients of hysteresis loss Ph and eddy current loss Pe. The frequency-depending core losses measured at frequencies of 50 kHz to 2 MHz were separated to each loss, and their proportions were determined. The results are shown in Table 8.

TABLE 8

| No. | Temp. ° C. | Core Loss kW/m³ | Hysteresis Loss kW/m³ | Hysteresis Loss % | Eddy Current Loss kW/m³ | Eddy Current Loss % | Residual Loss kW/m³ | Residual Loss % |
|---|---|---|---|---|---|---|---|---|
| Example 1 | 20 | 375 | 113 | 30 | 209 | 56 | 52 | 14 |
| | 60 | 285 | 34 | 12 | 205 | 72 | 46 | 16 |
| | 100 | 430 | 65 | 15 | 266 | 62 | 99 | 23 |
| Example 2 | 20 | 390 | 117 | 30 | 220 | 56 | 54 | 14 |
| | 60 | 315 | 41 | 13 | 223 | 71 | 51 | 16 |
| | 100 | 515 | 81 | 16 | 310 | 60 | 123 | 24 |
| Example 3 | 20 | 485 | 150 | 31 | 263 | 54 | 73 | 15 |
| | 60 | 445 | 92 | 20 | 283 | 64 | 71 | 16 |
| | 100 | 685 | 171 | 25 | 316 | 46 | 199 | 29 |

As is clear from Table 8, Examples 1 and 2 of the present invention containing Nb or Ta exhibited drastically improved hysteresis loss and residual loss, lower loss in a wide temperature range, at 100° C. than Example 3 containing neither Nb nor Ta. This result is a novel discovery achieved by the present invention, indicating that in the heat treatment with slow cooling, the inclusion of Nb and Ta provides a MnZn ferrite core with further lower loss in a wide temperature range.

What is claimed is:

1. A method for producing a MnZn ferrite core comprising 53-56% by mol of Fe (calculated as $Fe_2O_3$), and 3-9% by mol of Zn (calculated as ZnO), the balance being Mn (calculated as MnO), as main components, and 0.05-0.4 parts by mass of Co (calculated as $Co_3O_4$) as a sub-component per 100 parts by mass in total of said main components (calculated as said oxides), which is used at a frequency of 1 MHz or more and an exciting magnetic flux density of 75 mT or less; comprising a step of molding a raw material powder for the MnZn ferrite to obtain a green body;

a step of sintering said green body and cooling it to a temperature of lower than 150° C. to obtain a sintered body of MnZn ferrite; and a step of conducting a heat treatment comprising heating the sintered body of MnZn ferrite to a temperature meeting the following conditions:

Condition 1: 200° C. or higher, and

Condition 2: (Tc−90)° C. to (Tc+100)° C., wherein Tc is a Curie temperature (° C.) calculated from the percentages by mol of $Fe_2O_3$ and ZnO contained in the main components of said MnZn ferrite, keeping the sintered body at said temperature for a predetermined period of time, and then cooling the sintered body from said keeping temperature at a speed of 50° C./hour or less.

2. The method for producing a MnZn ferrite core according to claim 1, wherein said sintering step provides the sintered body of MnZn ferrite with core loss Pcv of less than 4000 $kW/m^3$ between 0° C. and 120° C., at a frequency of 2 MHz and an exciting magnetic flux density of 50 mT.

3. The method for producing a MnZn ferrite core according to claim 2, wherein said heat treatment step provides the sintered body of MnZn ferrite with core loss Pcv of less than 1500 $kW/m^3$ between 0° C. and 120° C., at a frequency of 2 MHz and an exciting magnetic flux density of 50 mT.

4. The method for producing a MnZn ferrite core according to claim 1, wherein said MnZn ferrite further comprises 0.003-0.015 parts by mass of Si (calculated as $SiO_2$), 0.06-0.3 parts by mass of Ca (calculated as $CaCO_3$), 0-0.1 parts by mass of V (calculated as $V_2O_5$), and 0-0.3 parts by mass in total of Nb (calculated as $Nb_2O_5$) and/or Ta (calculated as $Ta_2O_5$) as sub-components, per 100 parts by mass in total of said main components (calculated as said oxides).

5. The method for producing a MnZn ferrite core according to claim 1, wherein said sintering step comprises a temperature-elevating step, a high-temperature-keeping step, and a cooling step;

said high-temperature-keeping step is conducted at a keeping temperature of higher than 1050° C. and lower than 1150° C. in an atmosphere having an oxygen concentration of 0.4-2% by volume; and said cooling step is conducted in an oxygen concentration in a range of 0.001-0.2% by volume from 900° C. to 400° C., and at a cooling speed of 50° C./hour or more from (Tc+70)° C. to 100° C.

6. The method for producing a MnZn ferrite core according to claim 5, wherein the cooling speed from said keeping temperature to 100° C. in said cooling step is 50° C./hour or more.

7. A MnZn ferrite core used at a frequency of 1 MHz or more and an exciting magnetic flux density of 75 mT or less, said MnZn ferrite core comprising 53-56% by mol of Fe (calculated as $Fe_2O_3$), and 3-9% by mol of Zn (calculated as ZnO), the balance being Mn (calculated as MnO), as main components, and 0.05-0.4 parts by mass of Co (calculated as $Co_3O_4$), 0.003-0.015 parts by mass of Si (calculated as $SiO_2$), 0.06-0.3 parts by mass of Ca (calculated as $CaCO_3$), 0-0.1 parts by mass of V (calculated as $V_2O_5$), 0.05 parts or less (not including 0) by mass of Nb (calculated as $Nb_2O_5$), and 0-0.1 parts by mass of Ta (calculated as $Ta_2O_5$) as sub-components, per 100 parts by mass in total of said main components (calculated as said oxides), and having core loss Pcv of less than 1100 $kW/m^3$ between 0° C. and 120° C., at a frequency of 2 MHz and an exciting magnetic flux density of 50 mT.

8. The MnZn ferrite core according to claim 7, wherein said MnZn-ferrite magnetic core contains Nb, Ta and V as only Nb, a combination of Nb and V, or a combination of Nb and Ta;

the V content is 0-0.05 parts by mass (calculated as $V_2O_5$), the Nb content is 0.01-0.04 parts by mass (calculated as $Nb_2O_5$), and the Ta content is 0-0.05 parts by mass (calculated as $Ta_2O_5$); and said MnZn-ferrite magnetic core has core loss Pcv of 750 $kW/m^3$ or less between 0° C. and 120° C., at a frequency of 2 MHz and an exciting magnetic flux density of 50 mT.

* * * * *